Inventor
Warren J. Heldenbrand
Agent

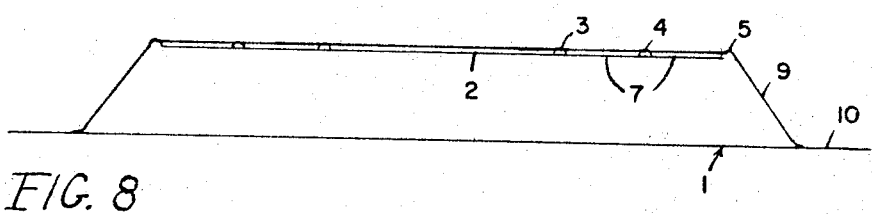
FIG. 6
FIG. 7
FIG. 8
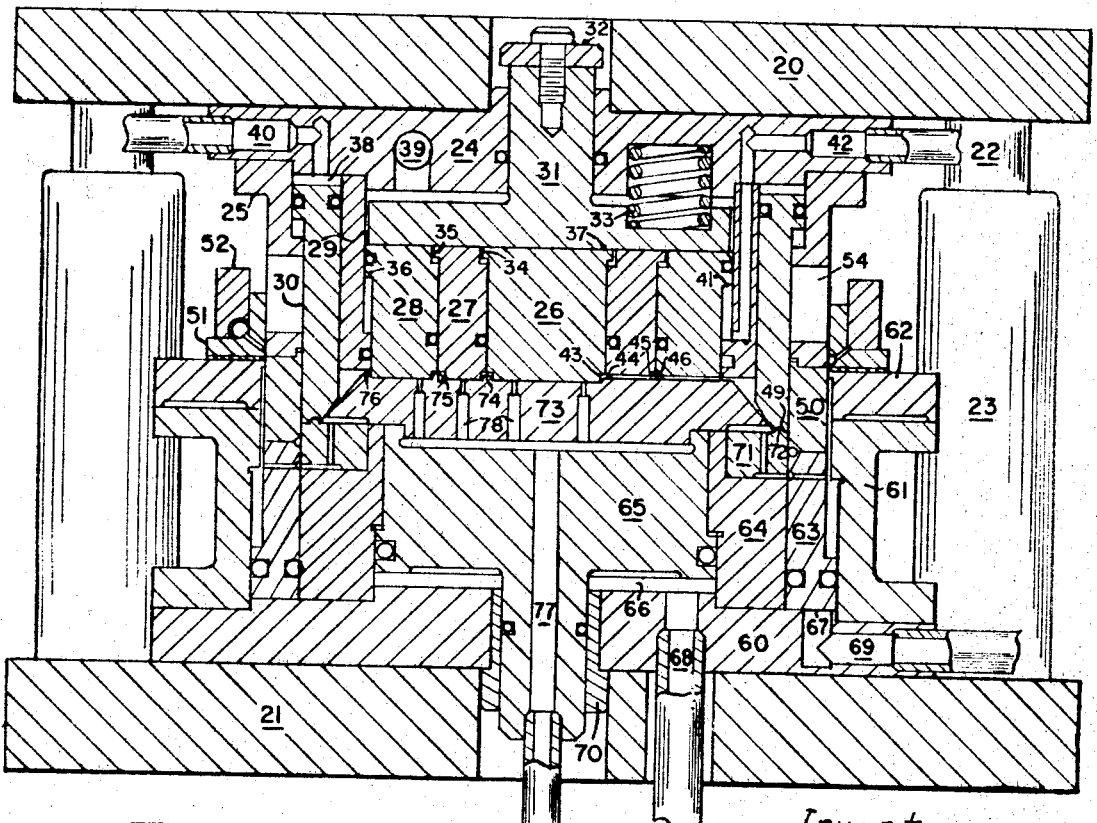
FIG. 3

Inventor
Warren J. Heldenbrand
Agent
James D Coffelt

United States Patent Office 3,446,169
Patented May 27, 1969

3,446,169
FOIL CONTAINER AND MACHINE FOR MAKING
FOIL CONTAINERS
Warren J. Heldenbrand, 224 Cowing Road,
Muncie, Ind. 47302
Filed Dec. 10, 1964, Ser. No. 417,401
Int. Cl. B21d 51/18; B21j 7/16
U.S. Cl. 113—120                                    5 Claims The present invention relates to disposable foil containers used in baking, packaging frozen foods and various other places where a disposable container is helpful. The present invention is being disclosed in the form of a pie pan of the type which is to be included with the pie from the manufacturer to the end purchaser of the pie. Pie pans of this general type are well known in the baking industry.

It is an object of this invention to form a pan of thin foil in the range of .002 to .005 inch thickness with improved strength.

It is a further object to provide a foil pan with a depressed base area with strengthening ribs of a depth greater than heretofore known in the foil container industry.

It is a further object to provide a foil pan with a re-enforced flange on the upper portion of the pan which includes a rib formed between the up-turned wall and the bead.

It is a further object to provide a pan with ribs formed in the base thereof which hold the base of the pan off of the oven hearth.

It is a further object to disclose a method of forming a foil pan with improved strength.

It is a further object to disclose an improved die to be used with a conventional press to form improved pans.

It is well known in the pressure forming art of foil containers to form pans with depressed bases, up-turned walls and flanges terminating in beaded edges, as shown for example in Patent No. 2,968,270. Some of the pans have designs stamped in their base which add very little to the rigidity of the container. I have invented a pan with ribs and spokes formed in the base portion thereof and a rib formed in the flange between the upturned wall and the bead. I have found that reenforcing ribs of increased height will greatly increase the rigidity of the pan. I have invented a new method of forming ribs in the base of foil pans of far greater depth than possible by prior methods. I have invented a new press operated die for forming foil pans with improved strength.

I have found that the placing of ribs in the flange of the pan greatly increases the capacity of the pan because the pan is suspended by the flange while it is being filled as it passes along a conveyor.

In prior forming methods the entire base portion and the up-turned walls were formed in a single step of the die. By this method any design or reenforcement could only be accomplished by stretching the foil over a design in the die. Therefore, it was not possible to form ribs of the type and height I have invented because the foil would tear if anything more than a mere design was attempted to be formed.

In my novel method of forming pans I form the pan and ribs by a series of folding operations which shape the pan to the design of the die without stretching the foil. In my method the first rib is formed by drawing foil toward the center of the base and spokes are formed between each adjacent rib to compensate for the difference in diameter of the foil drawn toward the center. The number of spokes is determined by the amount of foil drawn in to form the ribs. Since the ribs are formed before the walls are turned up, the foil can easily be folded to any desired height without stretching and thereby weakening the foil. Also with the step method the member that forms the center portion of the base holds the foil in position while the rest of the pan is being formed so it is not necessary to have a tight tension ring on the die as used by prior methods. For more detail reference will be made to the drawing.

I have also found that forming the ribs in the bottom of the pan in a downward direction will hold the pan bottom up off of the hearth of the oven so the heat can spread evenly under the pan. This is a great improvement over prior pans that set flat on the hearth of the oven. When frozen pies are placed in an oven in pans with flat bottoms the cold pie draws the heat from the hearth and the heat cannot circulate back to the center of the bottom which results in a white (or uncooked) spot in the bottom of the cooked pie. With my novel pan with the bottom held off of the hearth the heat is not drawn out and prevented from circulating which prevents the white spot.

FIG. 3 shows a cross section of the die in the fully closed position.

FIGS. 5 through 10 are line diagrams showing the form the foil takes after each step of the formation.

Figure 1:
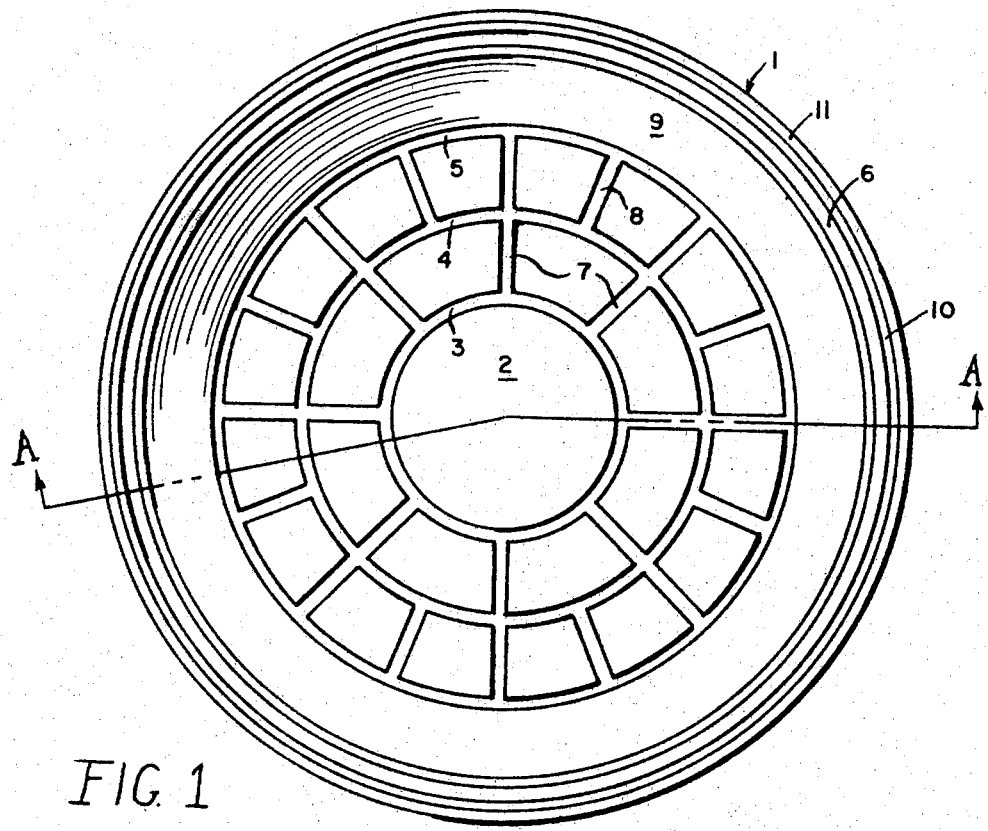
FIG. 1 shows the inside and the ribs in the bottom of the pan.
Figure 2:
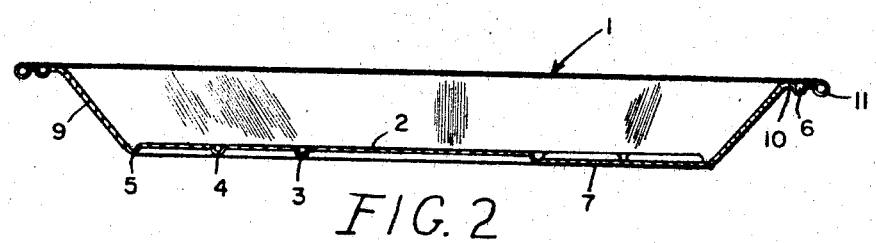
FIG. 2 shows a cross section of the pan.

In FIG. 1 the pan 1 has a base 2 reenforcement ribs 3, 4, 5, and 6, reenforcement spokes 7 and 8, up-turned wall 9, flange 10 and bead 11.

Figure 4:
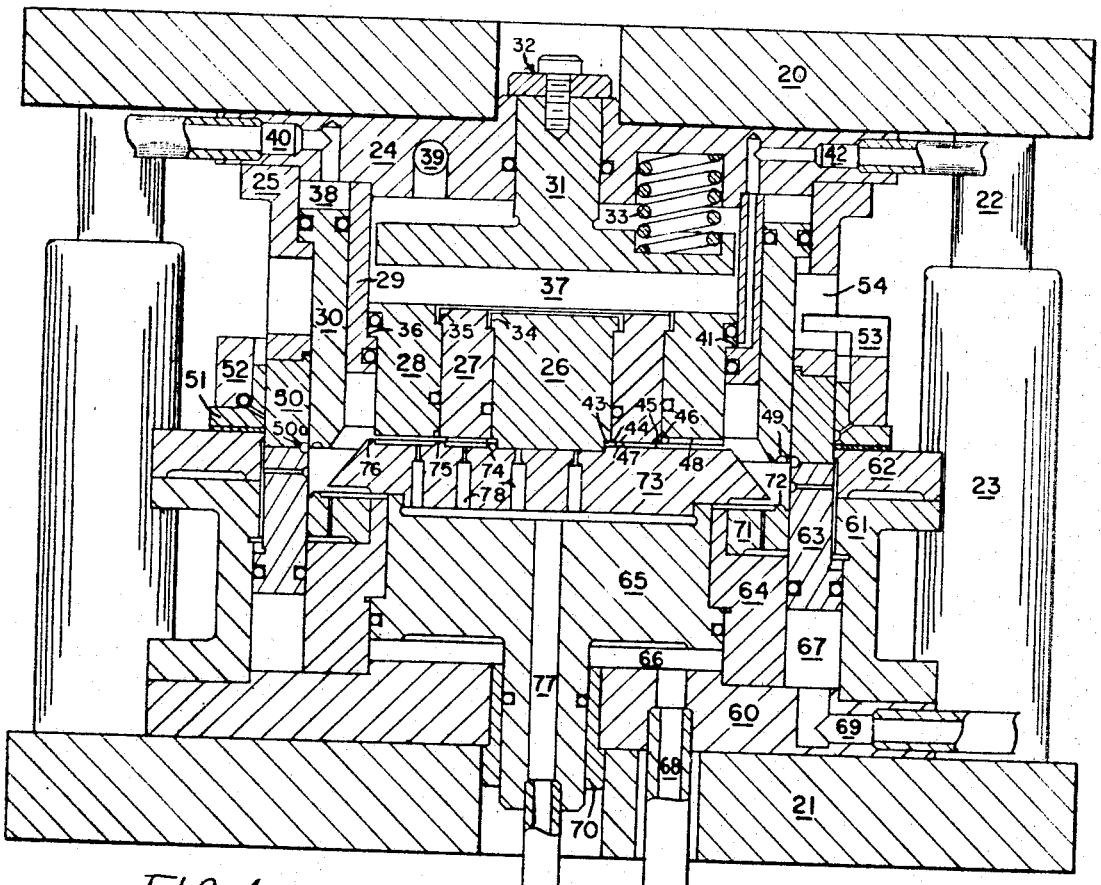
FIG. 4 shows a cross section of the die in a partially opened position.

As shown in FIG. 4 the die is attached to upper platen 20 and lower platen 21 of a conventional press of the type shown in the Bliss Power Press Handbook, not shown, with guide pins 22 telescoped in guide posts 23. An attaching member 24 and anchoring ring 25 connect a series of telescoping cylinders 26, 27, 28, 29 and 30 and a pressure pad 31 to the upper platen 20. Pressure pad 31 is fastened to member 24 by a sliding fastening means 32 and is spring biased downward by spring 33. Cylinders 26, 27 and 28 are limited in their amount of travel in a downward direction by shoulders 34, 35 and 36 formed on the respective cylinders and cooperating with the cylinder by which it is immediately surrounded. Cylinder 29 is fixed to supporting means 24 and forms the outer wall of an inner cavity 37 and the outer wall of cavity 38. The outer wall of cavity 38 is formed by ring 25. Fluid may be admitted or exhausted from cavities 37 and 38 by passages 39 and 40 respectively. Fluid can also be admitted into a cavity 41 formed between cylinders 28 and 29 through a passage 42.

Cylinder 26 has a groove 43 formed in the lower end thereof, cylinder 27 has grooves 44 and 45 formed in the lower end thereof and cylinder 28 has a groove 46 formed in the lower end thereof. Cylinders 27 and 28 have a series of radial grooves 47 and 48 respectively formed therein and cylinder 30 has a groove 49 formed in the lower end thereof.

Retaining ring 25 has an inner cutting ring 50 formed thereon and is surrounded by a tension ring 51 with a weight 52 formed thereon. The tension ring 51 is connected to the retaining ring 25 by fingers 53 engaged in slots 54.

A lower attaching member 60 is fixed to the lower platen 21. A retaining cylinder 61 is attached to member 60 and has an outer cutting ring 62 mounted thereon. Telescoped within retaining cylinder 61 are cylinders 63 and 64 and piston 65. Cylinder 64 is fixed to member 60 and forms the outer wall of cavity 66 and the inner wall of cavity 67. The outer wall of cavity 67 is formed by cylinder 61. Fliud is admitted to cavity 66 through passage 68 and fluid is admitted to cavity 67 through passage 69. Piston 65 is slideably mounted in cylinder 64 and a bushing 70 in member 60. Cylinder 64 has a lower die portion 71 attached thereto which carries rib 72. Piston 65 carries die portion 73 which has ribs 74, 75 and 76 thereon. Formed in the piston 65 and die portion 73 are air passages 77 and 78 respectively.

Figure 5:
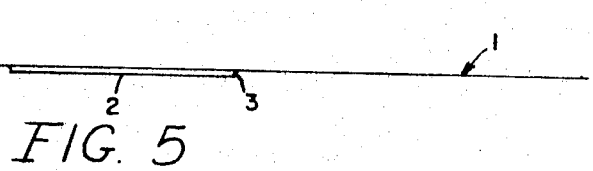

FIG. 5 shows the pan blank 1 after the die has completed its first step which forms the center portion of the base 2 and half or rib 3.

FIG. 6 shows the blank 1 after second step of the die which forms the second portion of the base 2, the other half of rib 3, spoke 7 and half or rib 4.

FIG. 7 shows the blank 1 after the third step of the die which forms the third portion of the base 2, the other half of rib 4, spokes 7 and 8, and half of rib 5.

FIG. 8 shows the blank 1 after the fourth step of the die which forms the other half of rib 5, the up-turned wall 9 and flange 10.

Figure 9:
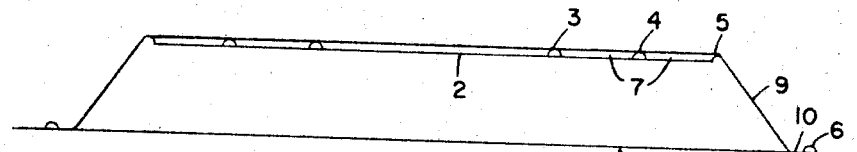

FIG. 9 shows the blank after the fifth step which forms the rib 6.

Figure 10:
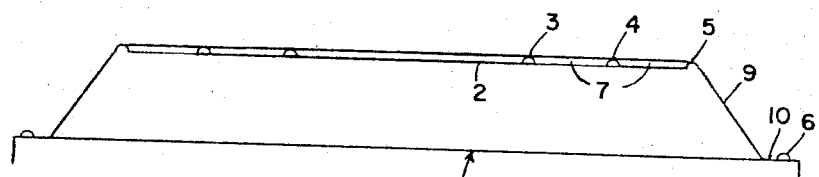

FIG. 10 shows the blank 1 after the sixth step which forms an up-turned portion for forming the bead 11.

OPERATION

With the die in its open position the foil is fed in between members 26, 27, 28, 30, 50 and 51 and members 62, 63 and 73. As the die starts closing, tension ring 51 contacts the foil causing a slight tension on the foil against outer cutting ring 62. The die advances and inner cutting ring 50 passes outer cutting ring 62 and cuts the blank 1 for the pan. The die continues to advance and cylinder 26, forced down by fluid pressure in cavity 37, forms the center portion of the pan against die 73 and half of rib 3 between groove 43 and rib 74. The pressure of cylinder 26 against die 73 holds the blank in place while the rest of the pan is formed. Cylinder 27 next forces the foil against die 73 and forms the other half of rib 3 between groove 44 and rib 74, half of rib 4 between groove 45 and rib 75 and spokes 7 between groove 47 and the lower die 73. Cylinder 28 now advances and forms the other half of rib 4 between groove 46 and rib 75, half of rib 5 between the outer edge of cylinder 28 and rib 76, and spokes 7 and 8 between groove 48 and the lower die 73. Cylinders 26, 27 and 28 are now firm against lower die 73 and members 25, 29 and 30 continue to advance and the pressure in cavity 37 begins to exhaust through passage 39. As member 30 advances it folds the foil over rib 76 and die 73 to form the other half of rib 5 and the up-turned wall 9 and then forms flange 10 against die portion 71. The die continues to advance and cylinder 30 is firmed against die 71 and the pressure in cavity 38 begins to exhaust through passage 40 and cutter ring 50 folds the foil down over die portion 71. The pressure pad 31 now strikes the upper end of cylinders 26, 27 and 28 forcing them downward against die 73 which forces piston 65 downward exhausting the pressure in cavity 66 through passage 68 until die 73 strikes ring 64. When die 73 strikes ring 64 cylinder 30 strikes member 24 and forms rib 6 between groove 49 and rib 72. The die has now reached the bottom of its stroke or its fully closed position as shown in FIG. 3.

Before the die starts its up-stroke, fluid pressure is admitted to cavity 41 through passage 42 to hold cylinders 26, 27 and 28 up against pressure pad 31 as the die opens. As the die opens fluid pressure is admitted to cavity 38 to hold cylinder 30 down against die portion 71 while fluid pressure is admitted to cavity 67 which forces cylinder 63 to follow cutter 50 in its up-stroke. When cutter 50 and cylinder 63 start up, the portion of the foil that was folded over between cutter 50 and die portion 71 begins to roll up in a groove 50a formed between cutter 50 and cylinder 63. The foil continues to roll up in groove 50a until the grove 50a reaches the point where cylinder 30 is holding the foil against die portion 71 at which time the bead 11 is completely formed and cylinder 30 starts up with the rest of the die. When cylinder 30 starts up, air pressure is admitted into passages 78 through passage 77 to separate the pan from die 73. As the die continues to open cutter 50 parts from cylinder 63 and passes the looser end of tension 51 which strips the waste foil from around the outside of the cutter 50. When the die reaches its fully open position the tension ring 51 has been separated from member 62 by the fingers 53 engaged in slots 54 and the pan has been separated from the die 73 by the air in passages 78 and is ready for removal from the die. The die is now ready to start another cycle.

I claim:

1. A method of manufacturing a foil container including steps of forming a first bottom portion and part of a first rib; forming a second bottom portion, the remaining part of said first rib, a series of spokes and half of a second rib; forming the remaining part of the second rib, an up-turned wall, and a flange with a third rib therein.

2. A method of manufacture of a foil container including the steps of forming a first bottom portion and part of a first reenforcing rib; forming the remaining part of said first rib, a second bottom portion with a series of reenforcing spokes therein and part of a second reenforcing rib; forming the remaining part of the second rib, a third bottom portion with a series of reenforcing spokes therein and the first half of a third reenforcing rib; forming the other part of said third rib, an up-turned wall, and a flange; forming a fourth reenforcing rib on said flange; and forming a bead on said flange.

3. In a press for forming foil containers comprising upper and lower platens, upper and lower dies and a series of fluid cavities for actuating portions of the dies, said upper die including a series of telescoping cylinders to form a foil container against the lower die.

4. In a press for forming foil containers comprising upper and lower platens, upper and lower dies and a series of fluid cavities for actuating portions of the dies, said upper die including a series of telescoping cylinders responsive to fluid pressure admitted to said cavities for forming a foil container in a series of steps against the lower die.

5. In a die set for forming foil containers comprising upper and lower die parts, said upper die part including a series of telescoping cylinders with grooves formed therein; said lower die part including a center portion with the outline of the inside of the container to be formed, a ring with a rib thereon, and a lower cylinder with a groove formed therein; said center portion including a series of ribs formed thereon; whereby said upper die cylinders sequentially contact the center portion, the ring and the lower cylinder to form the bottom, walls, flange and bead of the container and the grooves in the upper die cylinders cooperate with the ribs on the center portion and the ring to form the ribs in the bottom and the flange respectively.

References Cited

UNITED STATES PATENTS

| 2,775,383 | 12/1956 | Kollman et al. | 229—3.5 |
| 2,924,369 | 2/1960 | Richter | 229—3.5 |
| 3,021,990 | 2/1962 | Duskey | 229—3.5 |
| 1,690,523 | 11/1928 | Bell | 72—328 |
| 3,037,473 | 6/1962 | Wistler et al. | 72—328 |
| 3,039,413 | 6/1962 | Rogers | 72—328 |
| 1,270,933 | 7/1918 | Elsener | 113—120 |
| 1,537,753 | 5/1925 | Craven | 72—403 |
| 3,144,974 | 8/1964 | Eichner et al. | 113—120 |

RONALD D. GREFE, *Primary Examiner.*

U.S. Cl. X.R.

72—403, 414